April 1, 1941.    O. W. OERMAN    2,236,780
HARROW
Filed Aug. 28, 1939    2 Sheets-Sheet 1
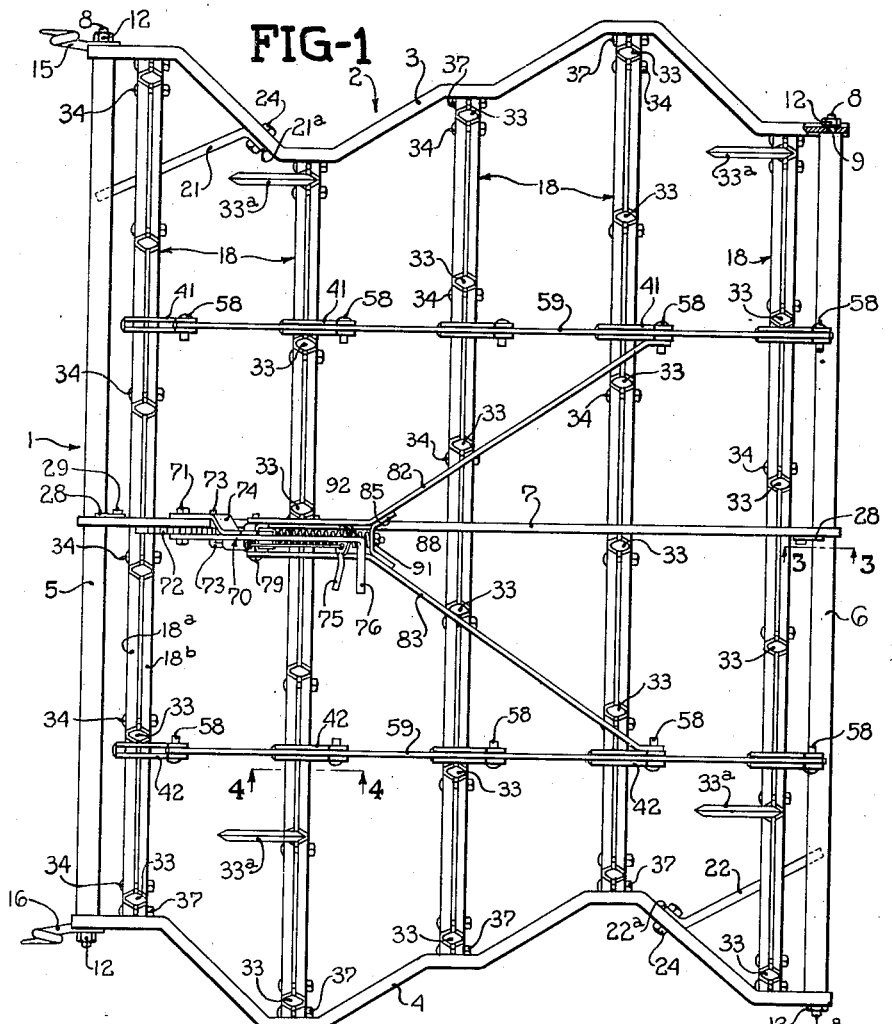
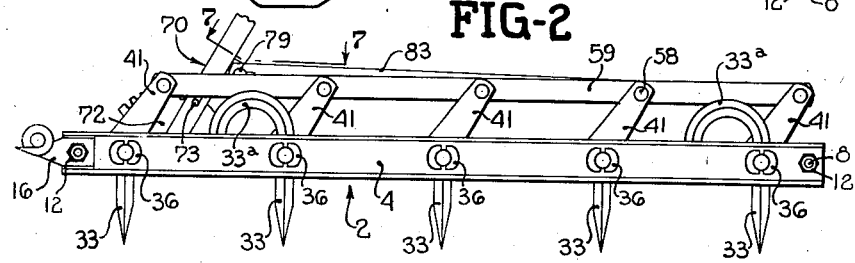
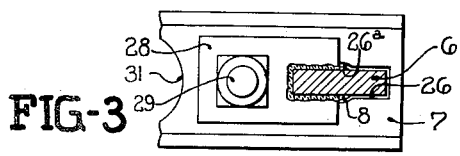
*INVENTOR:*
Orey W. Oerman
BY
*ATTORNEYS.*

April 1, 1941.   O. W. OERMAN   2,236,780
HARROW
Filed Aug. 28, 1939   2 Sheets-Sheet 2
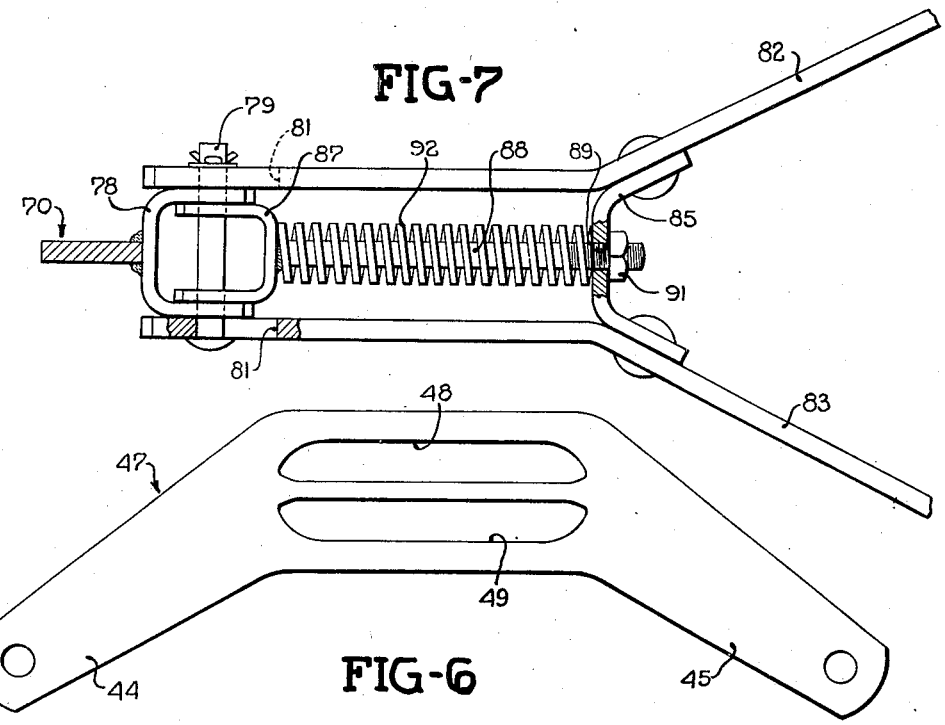
INVENTOR:
Orey W. Oerman
ATTORNEYS.

Patented Apr. 1, 1941

2,236,780

UNITED STATES PATENT OFFICE 2,236,780

HARROW

Orey W. Oerman, Moline, Ill., assignor to Deere & Company, Moline, Ill., a corporation of Illinois Application August 28, 1939, Serial No. 292,190

24 Claims. (Cl. 55—103)

The present invention relates generally to agricultural implements and more particularly to harrows which are used principally for finishing the seed bed and preparing the soil for planting.

The object and general nature of the present invention is the provision of a spike tooth harrow of the heavy duty type especially adapted for tractor service. One important feature of the present invention is the provision of a fully framed harrow section which includes end rails pivotally receiving the tooth bars and having front and rear cross bars rigidly fastened to the end rails whereby the proper alignment and free pivoting action of the tooth bars are maintained throughout the life of the implement. Further, it is another feature of this invention to provide a longitudinally extending center rail rigidly secured at its ends to the front and rear cross bars to aid in maintaining alignment and rigidity of the harrow.

An additional feature of the invention is the provision of improved heavy-duty rocker arms which are in the nature of strap-like members, each bent back upon itself and notched to provide looped clamping sections to receive the two parts of the tooth bar and the clamping bolt by which each rocker arm is fixed in position.

Still further, an additional feature of this invention is the provision of an improved cushioning and relief spring arrangement associated with the tooth tilting mechanism for protecting the harrow by cushioning the shock when the teeth encounter obstructions as when operating in stony or cloddy ground.

These and other objects and advantages of the present invention will be apparent to those skilled in the art after a consideration of the following detailed description of the preferred embodiment, taken in conjunction with the accompanying drawings.

In the drawings:

Figure 1 is a top view of a spike tooth harrow in which the principles of the present invention have been incorporated;

Figure 2 is an end view of the harrow shown in Figure 1;

Figure 3 is an enlarged sectional view taken along the line 3—3 of Figure 1, showing the manner of fixing the center rail in position;

Figure 4 is an enlarged fragmentary section, taken generally along the line 4—4 of Figure 1 and showing the preferred construction of the rocker arm;

Figure 5 is a view taken generally along the line 5—5 of Figure 4;

Figure 6 is a view of the blank from which the rocker arm is made; and

Figure 7 is a view taken generally along the line 7—7 of Figure 2 and showing the details of the cushioning or relief spring mechanism.

Referring now more particularly to Figures 1 and 2, the harrow section is indicated in its entirety by the reference numeral 1 and includes a frame 2 made up of right and left hand end rails 3 and 4, front and rear cross bars 5 and 6, and the center reinforcing rail 7. The front and rear rails or cross bars 5 and 6 are flat members disposed generally in a horizontal plane so as to be especially rigid in a fore and aft direction. The ends of each of the cross bars 5 and 6 are upset and rounded, as indicated at 8 in Figure 1, and the corresponding portion of the end rail is apertured, as at 9, to receive the associated upset portion 8 of the cross bar. The rounded upset portion at each end of each cross bar is threaded and receives a nut 12. At the forward end of the section two forged steel pigtail draft hooks 15 and 16 are apertured to receive the rounded ends 8 of the front cross bar 5, and when the front nuts 12 are tightened, the front ends of the end rails 3 and 4 and the draft hooks 15 and 16 are rigidly secured to the front cross bar. Also, when the rear nuts 12 are tightened, the rear ends of the end rails are securely fixed to the rear cross bar 6.

As best shown in Figure 1, the end rails 3 and 4 are curved or angled so as to conform to the staggered positioning of the several tooth bars 18, which results in a construction in which at diagonally opposite corners of the section the portion of the end rail is disposed at an acute angle with respect to the adjacent part of the cross bar connected thereto. Two relatively heavy corner braces 21 and 22 are provided at these portions of the implement, as illustrated in Figure 1. Each corner brace has an end bent, as indicated in 21a and 22a, respectively, the bent portion of each corner brace being apertured to receive a bolt 24. If desired, the other end of each of the corner braces may be bolted to the associated cross bar, but preferably the corner braces are welded to the cross braces, as best shown in Figure 1. It will be seen, therefore, that the disposition of the corner braces at the portions of the harrow section where the end rails connect with the cross bars at an acute angle provides an interconnected triangular arrangement which affords a maximum rigidity against distortion in a generally horizontal direction.

Each end of the center rail 7 is provided with an opening 26, extended as at 26a, to receive the associated cross bar and the upset ends 8. A small bracket 28 is welded to and extends longitudinally from the generally central portion of the cross bar, and a bolt 29 serves to secure the center rail 7 to the associated brackets 28. Thus, the center rail 7 can be secured rigidly to the other frame parts, and cooperates therewith to provide a fully framed section that insures lasting alignment. Also, the center rail 7 is provided with a number of apertures 31 to receive the central portions of the associated tooth bars 18.

Each tooth bar 18 is made up of a pair of semi-oval sections 18a and 18b, and the sections 18a and 18b are notched at opposite points to receive the harrow teeth 33. A bolt 34 passes through aligned apertures adjacent each tooth and when tightened causes each tooth to be gripped and held firmly and rigidly in position. Each of the end rails 3 and 4 is apertured and rockably receives shouldered thimble bearings 36 (Figure 2), and the inner ends of the bearings 36 are bolted, as at 37, to the ends of the associated tooth bars 18. Certain of the teeth 33 are formed with curved sections 33a which serve as means for supporting the harrow when the teeth are swung rearwardly into their transport position.

The teeth 33 can be tilted from a vertical position, in which greatest penetration is secured, to practically any slanting position desired by means of a tilting mechanism which will now be described.

A pair of rocker arms 41, 42 are secured to each of the tooth bars 18, the rocker arms 41 being disposed in fore and aft alignment at one side of the center rail 7 while the other rocker arms 42 are disposed in fore and aft alignment at the other side. The arms 41 and 42 are substantially identical, and therefore a detailed description of only one of them will be sufficient. Referring now more particularly to Figures 4, 5 and 6, it will be seen that the arm 41 consists of a strap-like member bent into generally U-shaped formation and having two sections 44 and 45 (Figure 5) maintained in spaced apart relation and connected together by loop portions. The blank from which the arm 41 is formed is best shown in Figure 6 and is indicated by the reference numeral 47. The ends 44 and 45 lie at an angle with respect to each other and the central portion of the blank is punched to form two generally parallel elongated recesses 48 and 49. When the blank is bent to form a complete arm, as shown in Figures 4 and 5, the two recesses 48, 49 form open end slots 51 and 52 separated by an intermediate section 53 and lying between the outer sections 54 and 55, these sections forming loops which receive and support a clamping bolt 56 which is adapted to be disposed within the loop sections 53, 54 and 55. The intermediate section 53 of the arm 41 is adapted to be disposed in the slot or space lying between the tooth bar sections 18a and 18b, and the particular function of the intermediate section 53 is, first, to support the clamping bolt 56 and, second, to prevent the clamping stresses from bending the tooth bar sections when the bolt 56 is tightened. Preferably, the openings 48 and 49 are so dimensioned that when the arm is completed and the bolt 56 is disposed in its supporting loops, the tooth bar is held in position in contact with the ends of the openings 48 and 49 and, in turn, engaged by the clamping bolt 56.

The outer ends of each pair of arm sections 44 and 45 are apertured to receive a pivot pin 53, and between the spaced apart sections 44, 45 of each arm is disposed a longitudinally extending link 59 which is apertured to receive the several pivot pins 58. As best shown in Figure 5, each pivot pin includes a head 61 at one end and a cotter key 62 at the other end. The other set of arms 42 are likewise apertured to receive pivot pins and are connected by a link substantially the same as described above, and hence the same reference numerals have been used. Thus, by virtue of the two connecting links 59 and associated arms, all of the tooth bars 18 and associated teeth 33 swing or rock in unison into and out of any desired tilting position.

The tilting lever for controlling the position of the several tooth bars is indicated in its entirety by the reference numeral 70. The lever 70 is mounted by a pivot bolt 71 on the forward portion of the center rail 7, this portion of the rail 7 also carrying a sector 72 which is bolted or otherwise secured to the center rail in any suitable manner. The sector is notched to cooperate with a detent 73 biased for movement toward the sector by suitable spring means (not shown) and slidable in slots formed in the lever 70 and in the associated brace or strap 74. The detent is controlled by a hand grip 75 pivotally mounted adjacent the handle 76 of the lever 70 and connected to the plunger 73 by a link or the like.

Secured to the hand lever 70 is a U-shaped bracket 78, the intermediate portion of which is welded to the hand lever and the end portions are apertured to receive a pivot pin 79 which extends through slots 81 formed in the forward ends of a pair of divergent operating links 82 and 83. The forward portions of the links 82 and 83 are connected together by a transverse bracket 85 and forward of the latter the bars or links 82 and 83 extend generally in parallelism. The rear ends of the divergent links 82 and 83 are bent and apertured to engage and receive the associated pivot pins 58 which are carried by the next to the last pair of rocker arms 41 and 42, as best shown in Figure 1.

A generally U-shaped yoke 87 is apertured and is mounted on the pivot pin 79. A shank 88 is welded at its forward end to the yoke 87 and has its rear end threaded and extended through an opening 89 formed in the central portion of the bracket 85. A nut 91 is threaded onto the rear end of the shank 88, and a cushion or relief spring 92 is disposed between the bracket 85 and the yoke 87 which is pivoted to the pivot pin 79 that is carried by the hand lever 70, as described above.

In operation, the harrow section is propelled across the field by any suitable draft means, such as a tractor, operatively connected to the draft hooks 15 and 16. The harrow teeth may be set in a vertical position, the position of maximum depth, by manipulating the hand grip 75 to disengage the latch 73 and moving the hand lever 70 rearwardly into the position shown in Figure 2. This movement of the hand lever 70 acts through the yoke 87 to compress the cushion or relief spring 92, which in turn transmits the force through the divergent links 82 and 83 to the connecting links 59 and hence swings all of the teeth 33 in a clockwise direction (Figure 2) into their vertical position. Where desired, the teeth may be slanted rearwardly by moving the hand lever 70 to a more forward position, but in any position of the teeth, if the latter should strike an obstruction during operation, the shock incident thereto is not transmitted directly to the hand lever and other parts of the harrow but, instead, is at least partially absorbed by the cushioning spring 92. The relative movement between the links 82 and 83 and the hand lever 70, which is normally fixed in position by its latch 73, is accommodated by the slots 81, which permit the links 82 and 83 to move forwardly, or to the left as viewed in Figure 7, whenever the shock is sufficient to compress the spring 92. A nut 91 may be turned into various positions to impose more or less compression in the spring 92, as desired.

While I have shown and described above the preferred structure in which the principles of the present invention have been embodied, it is to be understood that my invention is not to be limited to the particular details shown and described above but that, in fact, widely different means may be employed in the practice of the broader aspects of my invention.

What I claim, therefore, and desire to secure by Letters Patent is:

1. A spike tooth harrow comprising a pair of end rails, tooth bars connected to said end rails, and flat horizontally disposed front and rear cross bars, each having its ends rounded and inserted in openings in the end portions of said rails, and means for bolting the ends of said cross bars to the ends of said rails.

2. A full-framed spike tooth harrow section for tractor use and the like, comprising spaced apart end rails, a plurality of tooth bars pivoted to said end rails, there being openings in the front and rear ends of each rail, front and rear generally flat horizontally disposed cross bars, each end of said cross bar being rounded and threaded, the threaded portion of each cross bar being disposed in the associated ends of said rails, and nuts screwed onto said threaded ends of the cross bars for rigidly securing the end rails thereto.

3. A spike tooth harrow as defined in claim 2, further characterized by a pair of apertured draft hooks disposed over the threaded ends of said front cross bar, the associated nuts serving to secure said front cross bar and said draft hooks to the forward portions of said end rails.

4. A spike tooth harrow as defined in claim 2, further characterized by a center rail having openings to receive and support said tooth bars and slots extending longitudinally of the center rail at the ends thereof for receiving the central portions of said cross bars.

5. A spike tooth harrow as defined in claim 2, further characterized by a center rail having openings to receive and support said tooth bars and slots extending longitudinally of the center rail at the ends thereof for receiving the central portions of said cross bars, and means for rigidly securing the front and rear ends of said center rail to said front and rear cross bars, comprising a vertical bracket carried by the associated cross bar and means securing each bracket to said center rail.

6. A spike tooth harrow as defined in claim 2, further characterized by said tooth bars being staggered transversely and said end rails being curved so as to receive the ends of said tooth bars, one end of each of said end rails forming an acute angle with respect to the associated cross bar, and a corner brace connecting said one end of each end rail to the associated cross bar.

7. A spike tooth harrow adapted to be propelled by a tractor or the like, comprising a pair of end rails, a plurality of tooth bars mounted for rocking movement in said end rails, a pivotally mounted adjusting lever disposed adjacent the forward end of the harrow, an arm fixed to each of said tooth bars and connected to swing the latter in unison, and a yielding connection between said pivotally mounted lever and said tooth bars comprising link means connected with said arms and extending forwardly to said pivotally mounted lever, and a compression spring anchored at its rear end to said link means and operatively connected at its forward end with said lever, whereby rearward swinging movement of the latter acts through said compression spring to swing said tooth bars into working position, said compression spring yielding to permit said link means and tooth bars to move relative to said lever when one or more harrow teeth encounter an obstruction.

8. A spike tooth harrow comprising a pair of end rails, a plurality of tooth bars mounted for rocking movement on said end rails, two sets of arms fixed to said tooth bars, link means connecting the arms of each set together for rocking said tooth bars simultaneously, a pivotally mounted lever disposed in a position between said link means, a pair of divergent links pivotally connected at their free ends with said link means, a lost motion connection between said lever and the other ends of said links, and a compression spring anchored at one end to said links and reacting against said lever.

9. A harrow comprising a pair of end rails, rockably mounted tooth bars carried thereby, a pair of divergent bars operatively connected at their outer ends with said tooth bars for rocking all of them simultaneously, the inner ends of said links terminating in spaced apart generally parallel sections, a bracket operatively connecting said sections, a pivotally mounted lever operatively disposed in a plane centrally of the parallel sections of said links, and a compression spring bearing at one end against said bracket and reacting at the other end against said lever.

10. A harrow as defined in claim 9, further characterized by the parallel portions of said links being slotted, a pin carried by said lever and disposed in said slots, whereby the lever is connected with said links with limited relative movement, said spring being disposed between said parallel portions of said links and reacting at one end against said connecting bracket and at the other end against said pin.

11. A harrow comprising a pair of end rails, a plurality of tooth bars mounted for rocking movement on said rails, a pair of arms fixed to each of said tooth bars, said arms being arranged in alignment transversely of said tooth bars, a link pivotally interconnecting one set of arms, a second link pivotally interconnecting the other set of arms, a pair of divergent links pivoted at outer ends to said first mentioned links, respectively, a bracket secured to the inner ends of said divergent links, said bracket being apertured, and the inner ends of said divergent links having slots therein, a pivotally mounted lever disposed in a generally vertical plane between the slotted ends of said divergent links, a U-shaped bracket fixed to said lever, a pin carried by said U-shaped bracket and disposed in the slots in said divergent links, a yoke pivotally mounted on said pin in a position between the ends of said U-shaped bracket and the slotted portions of said divergent links, a shank fixed at one end to said yoke and having its other end threaded and extending through the aperture in said first mentioned bracket, and a compression spring surrounding said shank and bearing at one end against said first mentioned bracket and at the other end against said yoke, serving thereby to yieldingly hold said tooth bars in one position relative to said lever with said pin at one end of each of said slots.

12. A rocker arm for the tooth bar of a harrow comprising a sheet metal member having an opening therein and folded back upon itself so as to form a tooth bar receiving slot, the looped portions of said arm at each side of said slot forming bolt receiving loops, and clamping bolt means disposed in said loops for fixing said arm to said tooth bar.

13. A rocker arm as defined in claim 12, further characterized by the adjacent portions of said member at the end of the arm opposite said bolt receiving loops being spaced apart to receive a link therebetween, and link receiving pivot means carried by said spaced apart sections.

14. A rocker arm for the tooth bar of a spike tooth harrow or the like, comprising a generally U-shaped strap member having an open end notch at one end of the arm to receive said tooth bar, portions of the arm being formed with loop sections at each side of said notch to receive a clamping bolt or the like.

15. A rocker arm for the tooth bar of a spike tooth harrow or the like, comprising a member bent into generally U-shaped formation with two spaced apart sections with a connecting loop at one end of the arm, and a tooth bar receiving slot formed in the loop end of said arm.

16. A rocker arm for a slotted tooth bar of a spike tooth harrow or the like, comprising a strap-like member bent into generally U-shaped formation, the looped portion of said member having a pair of open end slots formed therein to provide three sections, the outer sections being adapted to embrace and be clamped against the outer sides of the tooth bar and the intermediate section being adapted to be disposed in the slot in said tooth bar, and clamping means for clamping said arm to said tooth bar.

17. A rocker arm as defined in claim 16, further characterized by said clamping means comprising a clamping bolt supported in said outer and intermediate arm sections.

18. A rocker arm formed from a blank that comprises a member having an elongated opening so that when said member is bent generally by the transverse axis said opening forms an open end tooth bar receiving slot.

19. A rocker arm formed from a blank that comprises a member having a pair of substantially parallel openings formed in the generally central portion of the blank, whereby when the member is bent generally about a transverse axis said openings form a pair of open end slots separated by an intermediate section.

20. A spike tooth harrow comprising a plurality of slotted tooth bars, frame means including a pair of end rails in which the ends of said tooth bars are pivoted, front and rear cross bars secured at their ends to the front and rear ends of said rails, and a center rail secured at its front and rear ends to said front and rear cross bars, a tilting lever pivoted at one end to said center rail, a pair of rocker arms secured to each tooth bar at opposite sides of said center rail, each rocker arm consisting of a generally U-shaped member having its looped end formed with two open end notches, with an intermediate section adapted to be disposed in the slot of the associated tool bar and a clamping bolt disposed within the looped portion of said arm and its intermediate section for clamping the arm in position on said tooth bar, a pair of connecting links, one link being pivotally connected to each rocker arm at one side of said center rail and the other link being pivotally connected to the outer end of each of the rocker arms at the other side of said center rail, and a cushioning connection extending from said lever to said links, comprising a pair of divergent links connected at their outer ends to said connecting links and fixed at their inner ends in spaced apart relation, said spaced apart ends being slotted, a pivot pin slidably disposed in said slots, means connecting said lever with said pivot pin, and a cushioning spring disposed between said spaced apart ends and connected at one end with said pivot pin and reacting at its other end against the connected portions of said divergent links.

21. An arm adapted to be attached to a bar, comprising a sheet metal member having an opening therein and folded back upon itself so that said opening forms a bar receiving slot, the walls of said opening being substantially parallel whereby the width of said slot is substantially uniform and said arm may be mounted on said bar from the side of the latter, and means engaging the looped portions of said arm at each side of said slot for fixing said arm to said bar.

22. An arm adapted to be attached to a bar, comprising a member having an opening centrally therein and folded back upon itself at its central portion so that said opening forms a bar receiving slot, the two contiguous parts of said member being in parallel spaced apart relation and of substantially the same length, the looped portions of said arm at each side of said slot forming bolt receiving loops, and clamping bolt means disposed in said loops for fixing said arm to said tooth bar, the ends of said parts opposite said slot being provided with transversely aligned pivot receiving openings.

23. An arm for an agricultural implement having a bar to receive said arm, the latter comprising a member having an elongated central opening and folded back upon itself generally about a central transverse axis so as to form two parallel sections of substantially the same length and an open ended slot at one end of the arm to receive said bar, the ends of said section opposite said slot having transversely aligned pivot receiving openings, and means adapted to be disposed within the looped portions of said arm at each side of said slot for fixing said arm to said bar.

24. In an agricultural implement, a bar, a link adapted to be pivotally connected with said bar, and an arm for connecting said link to said bar, said arm comprising a member having an elongated central opening and folded back upon itself generally about a central transverse axis so as to form an open ended slot to receive said bar and two parallel sections of substantially the same length and spaced apart at the ends thereof opposite said slot a distance sufficient to receive said bar, said spaced apart ends having transversely aligned openings, and pivot means in said openings for connecting said link to said arm and accommodating relative movement therebetween.

OREY W. OERMAN.